United States Patent
Ahmed et al.

(10) Patent No.: US 6,782,261 B1
(45) Date of Patent: Aug. 24, 2004

(54) WIRELESS HANDOFF MANAGEMENT METHOD AND DEVICE

(75) Inventors: Walid Ahmed, Eatontown, NJ (US); Sarath Kumar, Eatontown, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/559,088

(22) Filed: Apr. 27, 2000

(51) Int. Cl.[7] .............................................. H04Q 7/20
(52) U.S. Cl. ........................ 455/436; 455/437; 455/442
(58) Field of Search ............................. 455/434, 435.2, 455/435.3, 436, 437, 438, 439, 442, 452.1, 452.2, 524, 525, 69, 522, 513; 370/332, 331, 335

(56) References Cited

U.S. PATENT DOCUMENTS

| | | | | |
|---|---|---|---|---|
| 5,548,808 A | 8/1996 | Bruckert | ................ | 455/33.2 |
| 5,577,022 A | 11/1996 | Padovani | ................ | 370/13 |
| 5,590,177 A | 12/1996 | Vilmur | ................ | 379/60 |
| 5,970,414 A | 10/1999 | Bi | ................ | 455/456 |
| 6,021,122 A | 2/2000 | Tiedemann, Jr. | ............ | 370/331 |
| 6,266,529 B1 * | 7/2001 | Chheda | ................ | 455/436 |
| 6,307,849 B1 * | 10/2001 | Tiedemann, Jr. | ............ | 370/335 |
| 6,321,089 B1 * | 11/2001 | Han | ................ | 455/438 |
| 6,415,149 B1 * | 7/2002 | Bevan et al. | ................ | 455/442 |
| 6,574,211 B2 * | 6/2003 | Padovani et al. | ............ | 370/347 |
| 6,594,243 B1 * | 7/2003 | Huang et al. | ................ | 370/332 |

* cited by examiner

Primary Examiner—Jean Gelin

(57) ABSTRACT

In a wireless communication system, in which a mobile station is operable to monitor the signal strengths of a plurality of pilot signals transmitted from a plurality of base stations, a method and device by which the mobile station determines the membership of Active Set pilots by generating a quality metric derived as a function of (i) detected pilot signal strengths corresponding to the Active Set of pilots, and (ii) detected pilot signal strengths corresponding to a non-Active Set of pilots, determining a threshold value, the threshold value determined as a function of the quality metric, and assigning the pilot to, or removing the pilot from, the Active Set of pilots if the signal strength corresponding to the pilot exceeds the threshold value.

34 Claims, 3 Drawing Sheets

100

WIRELESS HANDOFF MANAGEMENT METHOD AND DEVICE

FIELD OF THE INVENTION

The present invention relates generally to wireless communication systems, in which are disposed multiple base stations, each of which broadcasts a distinguishing pilot signal. More particularly, the present invention relates to a novel and improved technique for the maintenance of an active pilot set by mobile stations.

BACKGROUND OF THE INVENTION

Handoff is the process of transferring a wireless call from one transceiver, a source transceiver, to a second transceiver, a target transceiver. There exist a number of different methods for conducting a handoff in a cellular and other wireless communication systems. For example, many systems utilize a hard handoff between transceivers (or base stations). A hard handoff is a handoff in which the call connection with the first transceiver or base station is broken prior to establishing the call connection with the second transceiver or base station. While hard handoffs may be performed quickly, the call quality is still affected during a hard handoff; and connections with the second transceiver or base station may be missed altogether, resulting in calls being dropped.

To minimize the effect of these problems, the idea of soft and softer handoffs were developed. A soft handoff is a handoff between one site and another. A softer handoff is a handoff between one sector and another sector, both located at the same site. The basic concept of soft/softer handoff is that the connection is established with the second transceiver before the connection with the first transceiver is broken. One type of system that utilizes soft handoffs is a code division multiple access (CDMA) system, although soft handoff schemes may be generally employed in any radiotelephone system in which the mobile station or device has the capability of monitoring the strength of signals transmitted by a plurality of base stations in parallel with the communication of an active call.

A CDMA system utilizes the concept of pilot channels. A pilot channel is an unmodulated, direct-sequence spread spectrum signal transmitted continuously by each CDMA base station. The pilot channel allows a mobile station to acquire the timing of the forward CDMA link (i.e. —handoff leg), provides a phase reference for coherent demodulation, and provides a means for signal strength comparisons between base stations for determining when to handoff. These pilot channels or pilots are generally assigned into one of a number of pilot sets by the mobile station, according to the status of these pilots with respect to the mobile terminal. A common classification of pilot sets is to divide such sets into the Active Set, the Candidate Set, the Neighbor Set and the Remaining Set. The Active Set is a set of those pilots that are selected for demodulation and combination by the mobile station; that is, Active Pilots participate in the call. The Candidate Set includes a list of those pilots that have been received by the mobile station with sufficient strength to be successfully demodulated, but have not been placed in the Active Set. Candidate Set pilots are thought of as being "next-in-line" for inclusion in the Active Set. Neighbor Set pilots are those pilots that are included in neither the Active Set nor the Candidate Set, yet are still considered likely future candidates for handoff. Normally, the Neighbor Set includes those pilots associated with CDMA channels that cover geographical areas near the mobile station. Remainder Set pilots are those CDMA network pilots of the current carrier frequency assignment that are not included in one of the previously described sets.

In a typical implementation of a mobile station's handoff management algorithm, handoff legs (forward links) are added/dropped to/from the Active Set according to some criteria based on ADD/DROP thresholds. These thresholds are either pre-specified by the designer or left to the base station to vary in some dynamic, adaptive manner that suits system requirements. In each case, the mobile station's ADD/DROP threshold setting algorithms and schemes are based on a subset of measurements collected for Active Set pilots only. Unfortunately, use of a linear combination of the Active Set pilot parameters in the threshold setting procedure may yield inappropriate or less than maximally efficient handoff decisions. For example, increasing/decreasing the ADD threshold value based on the simple sum of the Active Set pilot strengths may exclude useful legs from being added to the Active Set, or in the alternative, may result in inclusion of legs that offer no significant benefit. Similarly, increasing/decreasing the DROP threshold based on the simple sum of the Active Set pilot strengths may result in dropping otherwise beneficial legs from the Active Set, or in the alternative, preserving legs that offer no significant benefit. Generally, improperly adding or dropping legs may lead to the addition of unnecessary legs which only increase processing complexity; or may lead to an insufficient number of legs which can jeopardize the integrity of the call.

Additionally, improperly adding or dropping legs may cause "ping-ponging," a term used to describe an unwanted, repetitious process in which effective legs are dropped and then re-added shortly afterwards, or in which ineffective legs are added and then dropped shortly afterwards.

SUMMARY OF THE INVENTION

Handoff efficiency is increased and ping-ponging reduced in a wireless communication system, in which a mobile station is operable to monitor the signal strengths of a plurality of pilot signals transmitted from a plurality of base stations, by a method and device in which the mobile station determines the membership of Active Set pilots by generating a quality metric derived as a function of (i) detected pilot signal strengths corresponding to the Active Set of pilots, and (ii) detected pilot signal strengths corresponding to a non-Active Set of pilots, determining a threshold value, the threshold value determined as a function of the quality metric, and assigning the pilot to, or removing the pilot from, the Active Set of pilots if the signal strength corresponding to the pilot exceeds the threshold value.

BRIEF DESCRIPTION OF THE DRAWINGS

A more complete understanding of the present invention may be obtained from consideration of the following description in conjunction with the drawings in which.

DETAILED DESCRIPTION

An exemplary embodiment of the present invention is described for use in a code division multiple access (CDMA) cellular radiotelephone communication system as described in TIA/EIA, IS-95, Mobile Station-Base Station Compatibility Standard for Dual-Mode Wideband Spread Spectrum Cellular System.

However, the present invention may be generally employed in any radiotelephone system in which the mobile station has the capability of monitoring the strength of signals transmitted by a plurality of base stations in parallel with the communication of an active call. CDMA is a technique for spread-spectrum multiple-access digital communications that creates channels through the use of unique code sequences. Use of CDMA permits signals to be received and processed in the presence of high levels of interference.

The coverage areas of a cellular radiotelephone communication system may be divided into sectors, as is well known in the art. In a CDMA system the frequencies for communication are reused in every sector of every cell, and most of the interference on a given frequency, as seen by a mobile station, is from cells outside that in which the mobile station resides. The residual interference on a given frequency as seen by a mobile station is from the user traffic from within the same cell on the same frequency from time delayed (reflected) signals.

A CDMA base station communicates with a mobile station with a spread spectrum signal. Spreading consists of applying digital codes to the data bits that increase the data rate while adding redundancy to the CDMA system. The chips of all the users in that cell are then added to form a composite digital signal. The composite digital signal is then transmitted using a form of quadrature phase shift keying (QPSK) modulation that has been filtered to limit the bandwidth of the signal. Once a transmitted signal is received by a mobile station, the coding is removed from the desired signal.

Figure 1:
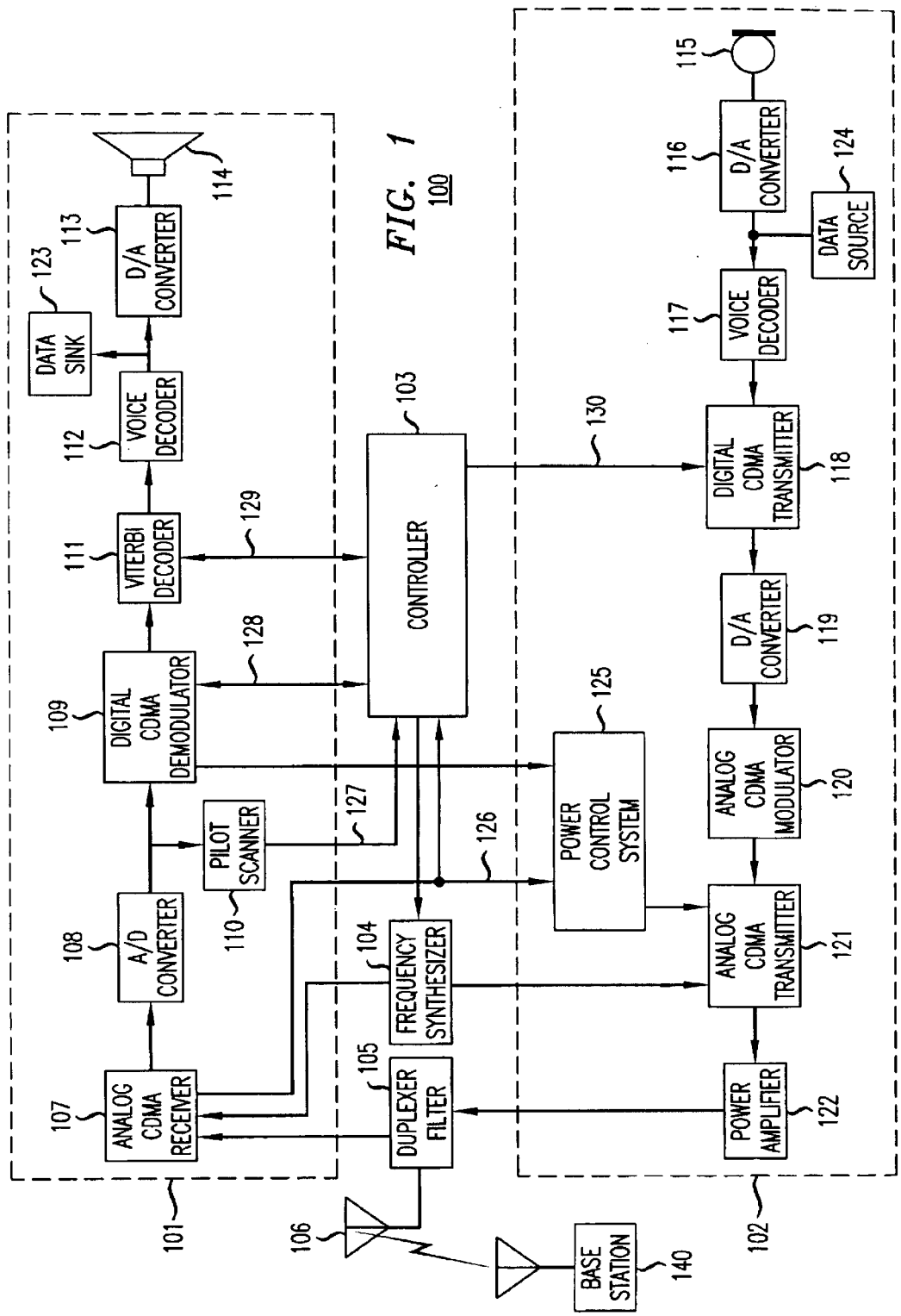
FIG. 1 is a block diagram of an exemplary mobile station that may be used in a wireless radiotelephone system in accordance with the principles of our invention.

FIG. 1 is a block diagram of a mobile station used in a wireless radiotelephone system in accordance with the principles of the present invention. In the exemplary embodiment illustrated in FIG. 1, the mobile station 100 is a cellular radiotelephone subscriber unit. The mobile station 100 may take many forms that are well known in the art, such as a vehicular mounted unit, a portable unit, or a transportable unit. According to the instant embodiment of the present invention, the mobile station 100 is a CDMA mobile station designed to be compatible with the CDMA cellular radiotelephone system as described in the aforementioned IS-95 Standard.

Active calls may comprise either voice or data communications between the mobile station 100 and a base station 140. Therefore, the present invention generally contemplates loss prevention of any type of information being transferred between the mobile station 100 and the base station 140. The mobile station 100 generally comprises a receiver lineup 101, a transmitter lineup 102, a controller 103, a frequency synthesizer 104, a duplexer filter 105 and an antenna 106. Both the receiver lineup 101 and the transmitter lineup 102 share the functions of the controller 103, the frequency synthesizer 104, the duplexer filter 105 and the antenna 106 as is well known in the art.

The receiver lineup 101 generally comprises an analog CDMA receiver 107, an analog to digital converter (A/D) 108, a digital CDMA demodulator 109, a pilot scanner 110 a Viterbi decoder 111, a voice decoder 112, a digital to analog converter (D/A) 113, a data sink 123 and a speaker 114. The transmitter lineup 102 generally comprises a voice source, such as microphone 115, or a data source 124, an A/D converter 116, a voice coder 117, a digital CDMA transmitter 118, a D/A converter 119, an analog CDMA modulator 120, an analog CDMA transmitter 121, a power amplifier 122 and a power control system 125.

In accordance with the instant embodiment of the present invention, the analog CDMA receiver 107 is substantially an analog receiver. The digital CDMA transmitter 118, the analog CDMA modulator 120, the analog CDMA transmitter 121, the power amplifier 122 and the power control system 125 are generally specified in the aforementioned IS-95 Standard. The frequency synthesizer 104, the duplexer filter 105 and the antenna 106 are substantially the same as that implemented in conventional analog cellular radiotelephone mobile stations.

In accordance with the principles of the present invention, the method utilized by the mobile station 100 for adding or dropping individual pilot signals from the active set is embodied as a software program in the controller 103. Generally, the controller 103 is comprised of a processor portion and a memory portion, and is typically manufactured as an integrated digital signal processor (DSP), although the principles of the present invention are not so limiting, and would apply to any controller having a processing function and a memory function, regardless of whether the functions are integrated or distributed amongst a plurality of processing and/or memory devices. In accordance with the instant exemplary embodiment, the controller 103 obtains received signal strength information (RSSI), indicative of a total energy ($I_o$) received by the mobile station 100 via line 126, pilot signal strength information via line 127 from the pilot scanner 110, signal strength information for the active call at line 128 from the digital CDMA demodulator 109, and received system control messages via line 129 from the Viterbi decoder 111. The controller 103 sends system control messages over line 130 to the digital CDMA transmitter 118. The method steps performed by the mobile station 100 and embodied within the controller 103 of FIG. 1 are further described with reference to FIGS. 2 and 3, in accordance with the principles of the present invention.

As previously described, IS-95 is the standard for digital CDMA for U.S. cellular radio systems. In order to support soft handoff functionality in IS-95, CDMA mobile stations 100 implement a system for managing the pilots that they are able to detect. The primary features of a mobile station's approach to this management include: (i) that each of the pilots detectable by the mobile station 100 are partitioned into one of four mutually exclusive pilot sets; the Active Set, the Candidate Set, the Neighbor Set, or the Remaining Set; (ii) that membership in any given pilot set is based on a pilot's stature as a potential soft handoff participant; (iii) that membership in each of the pilot sets is constantly updated, based on information determined regarding the local radio frequency (RF) environment; and (iv) that addition or deletion of a pilot from each pilot set is based upon a set of four translatable parameters; an ADD threshold, a DROP threshold, a compensation value, and a drop timeout threshold. The Active Set is a set of those pilots that are selected for demodulation and combination by the mobile station; that is, Active Pilots participate in the call. The Candidate Set includes a list of those pilots that have been received by the mobile station with sufficient strength to be successfully demodulated, but have not been placed in the Active Set.

Candidate Set pilots are thought of as being "next-in-line" for inclusion in the Active Set. Neighbor Set pilots are those pilots that are included in neither the Active Set nor the Candidate Set, yet are still considered likely future candidates for handoff. Normally, the Neighbor Set includes those pilots associated with CDMA channels that cover geographical areas near the mobile station. Remainder Set pilots are those CDMA network pilots of the current carrier frequency assignment that are not included in one of the previously described sets.

There are two versions of the IS-95 standard; IS-95A and IS-95B. A brief summary of the IS-95A standard handoff principles is first presented, as it relates to the present invention; subsequently followed a summary of the differences corresponding to the IS-95B standard. Four key parameters are included in the IS-95A standard to enable a soft handoff of the mobile station from base station to base station. The first is T_ADD. The T_ADD parameter is used as a pilot detection threshold. If a pilot included in the Neighbor Set or Remaining Set is determined by the mobile station as having a detected signal strength greater than the threshold T_ADD parameter, then the mobile station dynamically reassigns the pilot to the Candidate Set, without the assistance or intervention of any base station. The T_ADD parameter is also utilized in determining which pilots to include in the Active Set, but only in conjunction with a base station processing algorithm. In general, the lower the value of the threshold T_ADD parameter, the greater the number of pilots included in the Active Set. Including more pilots within the Active Set therefore directly corresponds with greater handoff activity. Conversely, a greater T_ADD parameter value results in less handoff activity. In situations of four (or more) strong pilots, a low value of T_COMP makes it easier for pilots to be included within the Active Set, thus helping to ensure that the strongest pilots in the area are included in the Active Set. However, doing so also increases pilot set interchange activity. Raising the T_COMP value increases the difficulty for pilot inclusion within the Active Set. However, high values assigned to T_COMP may increase the likelihood of neglecting a strong pilot that should be included. It should also be noted that a strong pilot that is not included in the Active Set is tends to be a strong source of interference.

The parameters T_DROP and T_TDROP together control the removal of a pilot from the Active Set. The basic mechanism is as follows: if a pilot's detected signal strength falls below T_DROP for T_TDROP seconds, then that pilot is removed from the Active Set. Additionally, T_DROP is also utilized to determine whether a pilot should be demoted from the Candidate Set. In general, T_DROP is a parameter that provides control over the ease in which pilots may be removed from the Active Set. T_TDROP, on the other hand, is primarily a mechanism to prevent premature dropping of pilots in a fading environment.

The following sequences are representative of exemplary message exchange sequences between a mobile station and base station in typical IS-95A handoff processes.

During a pilot ADD sequence.
1. Pilot signal strength exceeds T_ADD,
2. Mobile station sends a Pilot Strength Measurement Message (PSMM) to the base station,
3. Mobile station reassigns pilot to the Candidate Set,
4. Base station sends a Handoff Direction Message (HDM) to the mobile station,
5. Mobile station reassigns pilot to the Active Set, and
6. Mobile station sends a Handoff Completion Message (HCM) to the base station.

During a pilot DROP sequence:
1. Pilot signal strength first decreases to less than T_ADD (no immediate action),
2. Subsequent decrease in pilot signal strength results in decrease to less than T_DROP; therefore the mobile station initiates the handoff drop timer (T_TDROP),
3. If pilot signal strength still below T_DROP when the handoff drop timer expires, then mobile station sends a Pilot Strength Measurement Message (PSMM) to the base station,
4. Base station sends a Handoff Direction Message (HDM) to the mobile station,
5. Mobile station reassigns pilot to the Neighbor Set, and
6. Mobile station sends a Handoff Completion Message (HCM) to the base station.

Pilot signal strengths are reported by the mobile station to the base station using a PSMM, as noted above. In accordance with IS-95A, a PSMM includes the signal strengths of each pilot in the Active Set and the signal strengths of those pilots in the Candidate Set whose signal strength exceeds T-ADD. A PSMM is launched to the base station if any one of the following conditions are satisfied: (i) if a pilot is moved from Neighbor Set to Candidate Set based on the value of T_ADD, (ii) if a pilot included in the Candidate Set exceeds an Active Set pilot by a value of T_COMP, (iii) if the drop timer has expired for an Active Set pilot, or (iv) if an HDM is received and either condition ii or iii recited above exists (PSMM resent).

With reference to IS-95A, all pilots having a signal strength greater than the value of T_ADD are reported by the mobile station to the base station; therefore, the system generally includes each pilot having a signal strength greater than the value of T_ADD within the Active Set. However, with reference to IS-95B, the mobile station only reports pilots having signal strengths determined to be of sufficient magnitude to reassign to the Active. Set. In making this determination, the mobile station measures the signal strength of a Candidate Set pilot against a dynamic ADD threshold (DAT). The DAT value is determined as a function of the total detected energy of the Active Set pilots, in accordance with the equation $$DAT \text{ (dB)} = \max\left(\text{SOFT\_SLOPE} * 10 * \log\left(\sum_{i:P_1 \in A} PS_1\right) + \text{ADD\_INTERCEPT}, \text{T\_ADD}\right)$$

where $PS_i$ is the strength of the $i^{th}$ pilot in the Active Set, and A denotes the Active Set.

Furthermore, while IS-95A allows all pilots having a signal strength greater than T_DROP to remain in the Active Set, the IS-95B scheme allows only those pilots having a detected signal strength greater than a dynamic DROP threshold value (DDT) to remain in the Active Set. The DDT value is determined as a function of the total detected energy of the Active Set pilots, in accordance with the equation $$DDT_j \text{ (dB)} = \max\Big(\text{SOFT\_SLOPE} * 10 *$$

-continued $$\log\left(\sum_{\substack{i:P_1 \in A, \\ PS_1 \geq PS_j}} PS_i\right) + \text{DROP\_INTERCEPT, T\_DROP}$$

where $PS_j$ is the strength of the pilot in question, i.e., the pilot to be dropped; and A denotes the Active Set.

Additionally, three parameters are identified in IS-95B to determine these dynamic add and drop thresholds; namely, the ADD_INTERCEPT, the DROP_INTERCEPT and the SOFT_SLOPE.

The following sequences are representative of exemplary message exchange sequences between a mobile station and base station in typical IS-95B handoff processes. It is assumed that the Active Set initially includes pilot $P_1$ having a signal strength $PS_1$, and that pilot $P_2$, having a signal strength $PS_2$, is initially included in neither the Active Set nor the Candidate Set.

During a pilot ADD sequence:
1. Pilot $P_2$ signal strength exceeds T_ADD, mobile station reassigns the pilot $P_2$ to the Candidate Set,
2. Pilot $P_2$ signal strength exceeds DAT, DAT=max{(SOFT_SLOPE×10×log$_{10}$(PS$_1$)+ADD_INTERCEPT), T_ADD)}, mobile station sends a Pilot Strength Measurement Message (PSMM) to the base station,
3. Mobile station receives an Extended Handoff Direction Message (EHDM) or a General Handoff Direction Message (GHDM),
4. Mobile station reassigns pilot $P_2$ to the Active Set, and
5. Mobile station sends a Handoff Completion Message (HCM) to the base station.

During a pilot DROP sequence:
1. Pilot $P_1$ signal strength first decreases to less than DDT, DDT=max{(SOFT_SLOPE×10×log$_{10}$(PS$_2$)+DROP_INTERCEPT), T_DROP)},
2. Mobile station initiates the handoff drop timer (T_TDROP),
3. Handoff drop timer expires, pilot $P_1$ signal strength still below DDT, mobile station sends a Pilot Strength Measurement Message (PSMM) to the base station,
4. Mobile station receives an Extended Handoff Direction Message (EHDM) or a General Handoff Direction Message (GHDM),
5. Mobile station reassigns pilot to the Candidate Set and sends a Handoff Completion Message (HCM) to the base station,
6. Pilot $P_1$ signal strength decreases to less than T_DROP, mobile station initiates the handoff drop timer (T_TDROP), and
7. Handoff drop timer expires, mobile station reassigns pilot $P_1$ from the Candidate Set to the Neighbor Set.

Pilot signal strengths are reported by the mobile station to the base station using a PSMM, as noted above. In accordance with IS-95B, a PSMM includes the signal strengths of each pilot in the Active Set, the signal strengths of those pilots in the Candidate Set whose signal strength exceeds T-ADD, and the signal strengths of those pilots in the Candidate Set whose strength is greater than DAT. A PSMM is launched to the base station if any one of the following conditions are satisfied: (i) if the signal strength of a Candidate Set pilot exceeds the dynamic threshold based on the strengths of the pilots in the Active Set, (ii) if the signal strength of a Candidate Set pilot exceeds an Active Set pilot by T_COMP and also exceeds the DAT value, (iii) if the signal strength of a Neighbor Set pilot exceeds the maximum value of the DAT value and T_ADD value, or (iv) if the drop timer has expired for an Active Set pilot.

In contradistinction to the methods set out in IS-95A and IS-95B, our invention utilizes a signal quality metric (L) which reflects the effect of the pilot signal strengths of pilot sets other than merely the Active Set, and thus includes the interference contributed by non-Active set pilots, in determining a set of dynamic thresholds utilized for governing inclusion of pilots within the Active Set. That is to say, we have recognized that improved handoff performance may be had by considering the effect of detected pilots, in addition to those included in the Active Set, and evaluating the potential interference which may result from a decision to add or drop a pilot from the Active Set, when calculating the required thresholds.

For the purpose of generally describing the principles of the present invention, let the Active, Candidate, Neighbor, and Remaining Sets be defined as follows:

$$A = \{P_1^A, P_2^A, \ldots, P_{M_A}^A\}$$

$$C = \{P_1^C, P_2^C, \ldots, P_{M_C}^C\}$$

$$N = \{P_1^N, P_2^N, \ldots, P_{M_N}^N\}$$

$$R = \{P_1^R, P_2^R, \ldots, P_{M_R}^R\}$$

and let the signals strengths of the pilots be defined by the vectors:

$$S^A = [S_1^A, S_2^A, \ldots, S_{M_A}^A]$$

$$S^C = [S_1^C, S_2^C, \ldots, S_{M_C}^C]$$

$$S^N = [S_1^N, S_2^N, \ldots, S_{M_N}^N]$$

$$S^R = [S_1^R, S_2^R, \ldots, S_{M_R}^R]$$

Generally then, in accordance with the principles of our invention, a signal quality metric function (L) is formed such that:

$$L = f_L(S^A, S^C, S^N, S^R)$$

for the purpose of accurately reflecting the effect of the Active and non-Active Set's pilot signal strengths of the various pilot sets on call quality.

Recall, as previously described, that the IS-95A and IS-95B standards both include methods for calculating add and drop threshold values used to determine pilot inclusion into one of the four defined sets; the Active Set, the Candidate Set, the Neighbor Set, and the Remaining Set. Our invention also determines and utilizes add and drop threshold values; however, since we recognize that non-Active pilot signals can be a strong interferer, our invention utilizes add and drop threshold values which account for these interfering non-Active pilot signals. We define the add threshold function ($G_{ADD}$) as:

$$G_{ADD} = f_{G,ADD}(L)$$

and the drop threshold function ($G_{DROP}$) as:

$$G_{DROP} = f_{G,DROP}(L)$$

For example, if we were to apply the principles of our invention to the IS-95B standard, an equation describing our quality metric function, L, could be written, such that:

$$L = f_L(S^A) = \sum_{i=1}^{M_A} S_i^A$$

This is so because the quality metric function is determined solely by the pilot signal strengths of the Active Set. Therefore, using our definition of the add threshold value ($G_{ADD}$), we could express the IS-95B dynamic add threshold as:

$$G_{ADD} = f_{G,ADD}(L) = DAT$$
$$= \max\{SOFT\_SLOPE \times L + ADD\_INTERCEPT, T\_ADD\}$$

Similarly, using our definition of the drop threshold value ($G_{DROP}$), we could express the IS-95B dynamic drop threshold as:

$$G_{DROP} = f_{D,DROP}(L) = DDT$$
$$= \max\{SOFT\_SLOPE \times L + DROP\_INTERCEPT, T\_DROP\}$$

Using our thresholds $G_{ADD}$ and $G_{DROP}$ to define the IS-95B thresholds is a special case in which the value of the threshold is completely dependent upon the pilots included in the Active Set, and completely independent from pilots included in each of the other sets, therefore, the IS-95B definitions do not account for interfering non-Active Set pilots. Definitions which do account non-Active pilot interference, in accordance with the principles of our invention, may be expressed as:

$$G_{ADD} = f_{G,ADD}(L) = f_{G,ADD}(f_L(S^A, S^C, S^N, S^R))$$

and $$G_{DROP} = f_{G,DROP}(L) = f_{G,DROP}(f_L(S^A, S^C, S^N, S^R))$$

Figure 2:
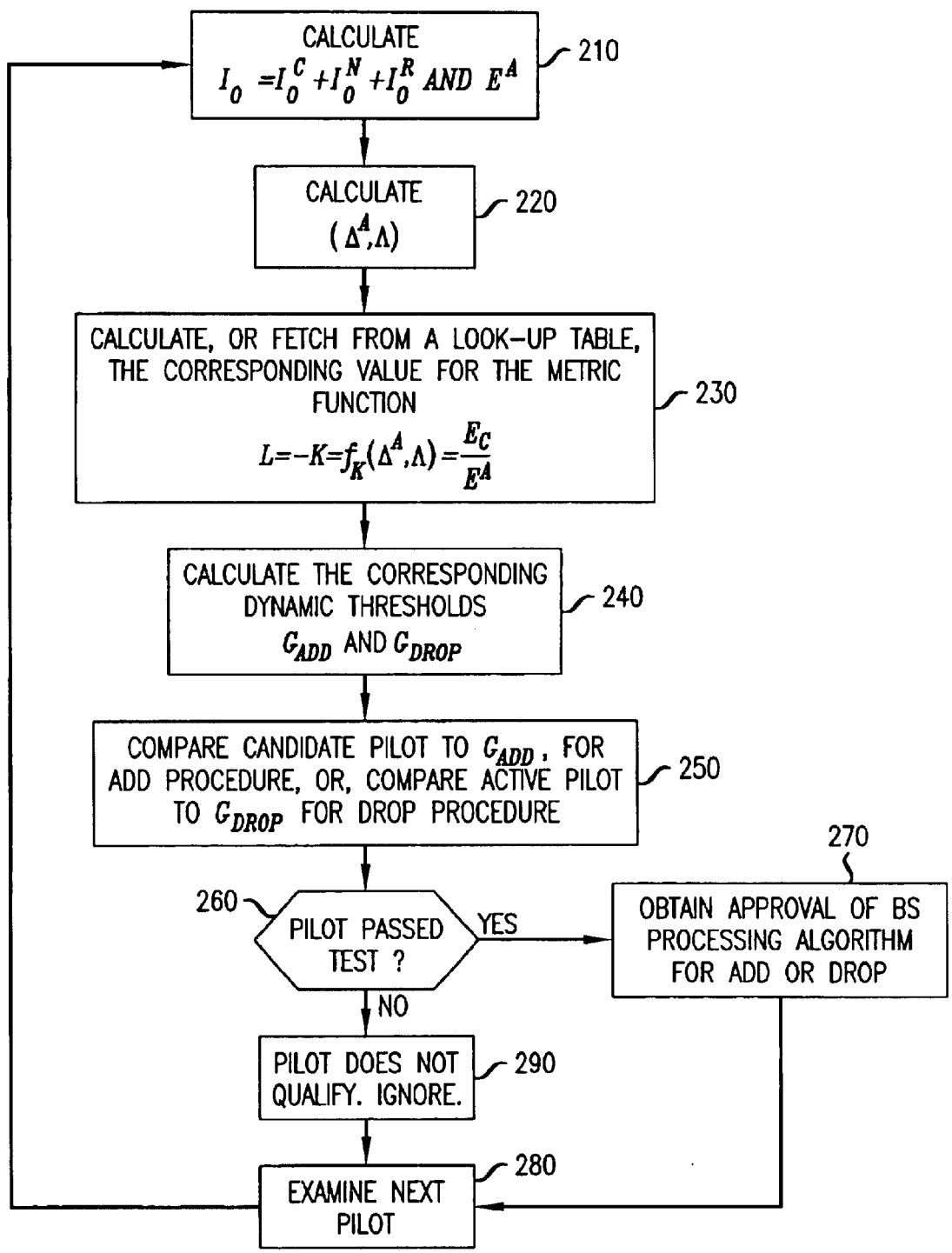
FIG. 2 is a flow chart illustrating the methodology of an exemplary embodiment of our invention in which a quality metric function, and therefore the add and drop threshold functions, are determined as a function of both Active and non-Active Set pilot signal strengths.
Figure 3:
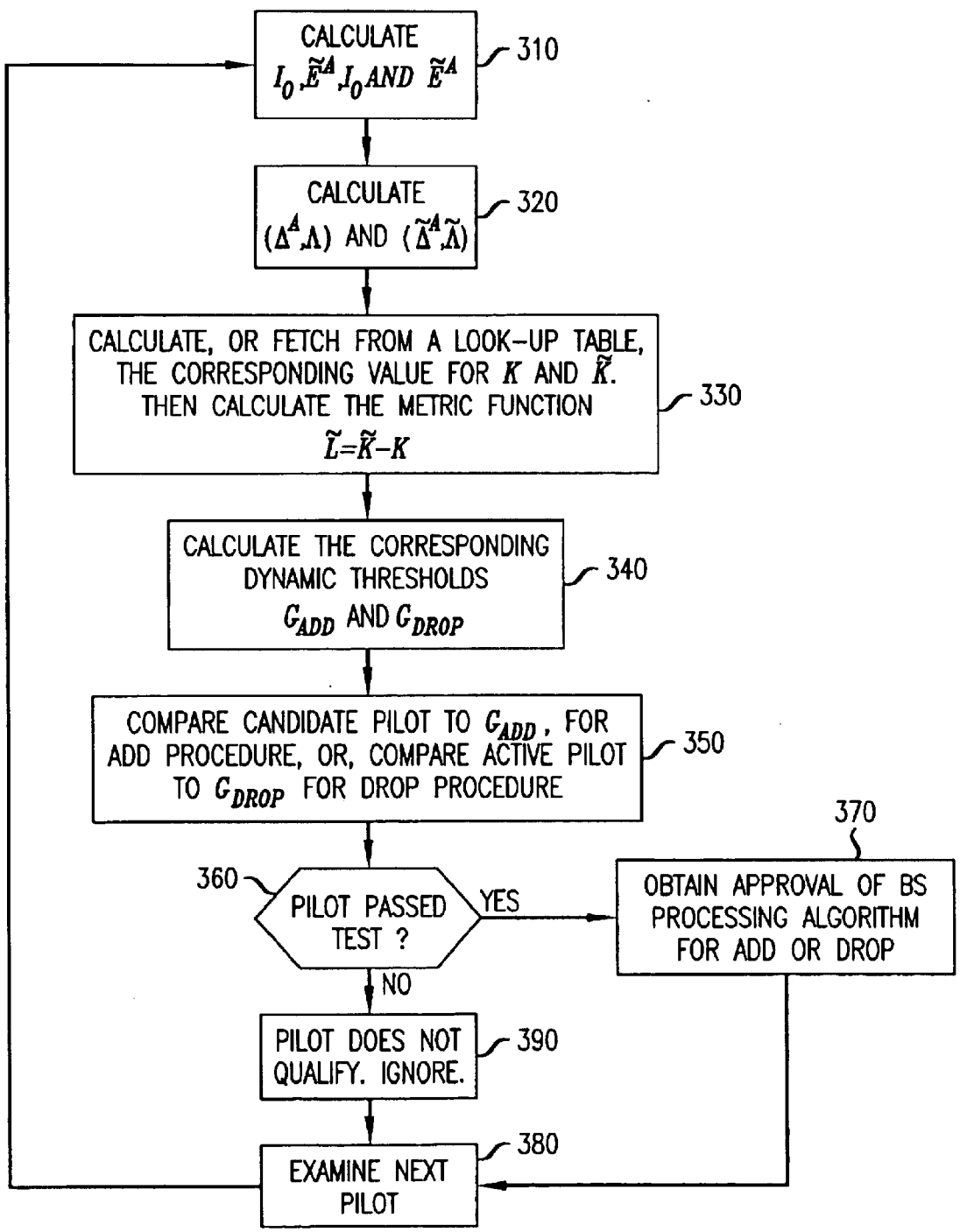
FIG. 3 is a flow chart illustrating the methodology of a second exemplary embodiment of our invention in which a quality metric function, and therefore the add and drop threshold functions, are determined as a function of both Active and non-Active Set pilot signal strengths.

The flow charts of FIGS. 2 and 3 illustrate two exemplary embodiments of our invention in which the quality metric function, and consequently the dynamic add and drop threshold functions, are determined as a function of both Active and non-Active Set pilot signal strengths (i.e., $L = f_L(S^A, S^C, S^N, S^R)$).

FIG. 2 illustrates the first disclosed embodiment. In accordance with step 210, calculation of the interference signal strength ($I_o$) and Active Set pilot signal strengths $E^A$ are performed. Therefore $$I_o = I_o^C + I_o^N + I_o^R$$

where $$I_o^C = \sum_{i=1}^{M_C} S_i^C$$

$$I_o^N = \sum_{i=1}^{M_N} S_i^N$$

$$I_o^R = \sum_{i=1}^{M_R} S_i^R$$

and $$E^A = \sum_{i=1}^{M_A} S_i^A$$

The quantity $I_o$ represents a composite value for the pilot signal strengths of non-Active Set pilots; which may include Candidate Set pilots, Neighbor Set pilots, and/or Remaining Set pilots. The quantity $E^A$ represents a composite of the pilot signal strengths of all of the pilots in the Active Set. Now, defining the tuple, $$\Delta^A = (\Delta_1^A, \Delta_2^A, \ldots, \Delta_{M_A-1}^A) \quad \text{(step 220)}$$

where $$\Delta_i^A = S_i^A - S_{i+1}^A$$

and the strengths $S_i^A; i=1, \ldots, M_A$ are arranged such that $S_i^A \geq S_{i+1}^A$. The tuple, $\Delta^A$, represents the pair-wise differences between the strengths of the Active Set pilots, thus providing an indication of the potential incremental gain obtained by combining Active legs. Additionally, an even more accurate analysis is obtained when utilizing the concept of Network Geometry. Network Geometry may be defined as $$\Lambda = \frac{E^A}{I_o}$$

Therefore, the Network Geometry ($\Lambda$), represents the signal-to-interference ratio. In practice, it is often the case that the contribution of quantities $I_o^N$ and $I_o^R$ to the total interference ($I_o$) is negligible and may be excluded from consideration, as these quantities are typically much smaller in magnitude than either $E_o^A$ or $I_o^C$.

Now, $$K = f_K(\Delta^A, \Lambda) = \frac{E_c}{E^A} \quad \text{(step 230)}$$

where the quantity $E_C$ represents the total combined received signal energy (excluding received pilot signals) for the corresponding $(\Delta^A, \Lambda)$, which is used so that a performance target (e.g., bit error rate (BER) or frame error rate (FER) target) for the signal is met. The quantity, K, is typically computed and tabulated for a specific system by means of accurate link level computer simulations, or via actual field-testing.

Now we can define the quality metric function L as $$L = -K$$
$$= -f_K(\Delta^A, \Lambda)$$

There is no need to restrict the dynamic threshold functions, $G_{ADD}$ and $G_{DROP}$, to a single particular definition. Rather, it is left to the system designer to choose suitable functions for the dynamic threshold functions (step 240). However, in one embodiment of our invention, the dynamic threshold functions, $G_{ADD}$ and $G_{DROP}$, are increasing monotones in the metric function L. Such a condition ensures that calls will have a minimum number of handoff legs for a given defined signal quality. That is, calls that already possess good legs should not be given additional legs unless these legs are determined to be worth adding.

Now, if a candidate pilot exceeds $G_{ADD}$, the candidate qualifies for addition subject to approval of the ADD algorithm performed by the base station. Similarly, if an active pilot goes below $G_{DROP}$, the active pilot qualifies for dropping subject to approval of the DROP algorithm performed by the base station (step 250). Base station approval is typically based on other criteria, in addition to whether or not the dynamic threshold values have been triggered. Design of the ADD/DROP algorithms (design of the base station processing algorithm) is beyond the scope of this description, since the present invention is used to determine functionality of the mobile stations and the manner in which a mobile station determines and sets its dynamic thresholds for the ADD and DROP procedures (step 260). Assuming that the base station processing algorithm approves of adding or dropping the proposed pilot, then the proposed pilot leg is added or dropped (as indicated) from the Active Set (step 270) and the next pilot is examined for inclusion or deletion from the Active Set (step 280). In the alternative, if the base station processing algorithm does not approve of adding or dropping the proposed pilot, then the proposed pilot leg is not added or dropped (as indicated) from the Active Set (step 290) and the next pilot is examined for inclusion or deletion from the Active Set (step 280).

The embodiment of our invention, as described in accordance with FIG. 2, determines the signal quality metric function (L) based upon the value of two quantities; namely (i) current Network Geometry (Network Geometry being determined as a function of the signal strengths of Active and non-Active Set pilots determined prior to any changes in the pilot membership among the various pilot Sets), and (ii) the differences between the signal strengths of Active pilots (represented by the tuple $\Delta^A$). FIG. 3, which represents the second embodiment of our invention for determining the signal quality metric function (L), and consequently the dynamic add and drop threshold functions, also illustrates a method for determining these functions based upon pre-change Network Geometry ($\Lambda$), and $\Delta^A$. However, it is also additionally determined by the predicted effect of the New Network Geometry, $\tilde{\Lambda}$ (which is calculated based upon the effect of adding or dropping the proposed pilot from the Active Set), and a determination of the predicted differences between the signal strengths of Active pilots should the proposed pilot be added or dropped from the Active Set ($\tilde{\Delta}^A$). In the embodiment illustrated in accordance with FIG. 3, these quantities are defined and determined in the following manner.

Allow $P_1^C$, having a signal strength of $S_1^C$, to represent the Candidate pilot in question. Then define and determine and/or calculate a set of predicted parameters should the proposed pilot be reassigned from the Candidate Set to the Active Set, or dropped from the Active Set, should dropping an Active Set pilot be contemplated (step 310). Therefore, the instant embodiment utilizes the signal strength of Active and non-Active Set pilots in determining whether to assign a pilot to ADD or DROP from the Active Set; and does so by considering both pre-assignment detected signal strengths and predicted post-assignment signal strengths. Thus, predicted post-assignment interference signal strength ($\tilde{I}_o$) is defined as $$\tilde{I}_o = \tilde{I}_o^C + \tilde{I}_o^N + \tilde{I}_o^R$$

where $$\tilde{I}_o^C = \sum_{\substack{i=1; \\ i \neq l}}^{M_C} S_i^C$$

$$\tilde{I}_o^N = \sum_{i=1}^{M_N} S_i^N$$

$$\tilde{I}_o^R = \sum_{i=1}^{M_R} S_i^R$$

and $$\tilde{E}^A = S_i^C + \sum_{i=1}^{M_A} S_i^A$$

The quantity $\tilde{I}_o$ represents the predicted composite signal strength of all of the pilots from the non-Active Sets; which may include Candidate Set pilots (excluding the pilot being evaluated for promotion to the Active Set), Neighbor Set pilots, and/or Remaining Set pilots. The quantity $\tilde{E}^A$ represents the predicted composite signal strengths of all the pilots included in the Active Set (including the pilot being evaluated for promotion to the Active Set).

It therefore follows that $$\tilde{\Lambda} = \frac{\tilde{E}^A}{\tilde{I}_o}$$

and $$\tilde{\Delta}^A = \Delta^{A \cup \{P_i^C\}}$$

thus, $\tilde{\Lambda}$ represents the predicted Network Geometry (with the Candidate Set pilot being evaluated for promotion being reassigned to the Active Set). Similarly, $\tilde{\Delta}^A$ represents the predicted pair-wise differences between the signal strengths of the Active Set pilots (with the Candidate Set pilot being evaluated for promotion being reassigned to the Active Set). The values ($\Delta^A, \Lambda$) and ($\tilde{\Delta}^A, \tilde{\Lambda}$) are calculated (step 320).

Now defining $$\tilde{K} = f_K(\tilde{\Delta}^A, \tilde{\Lambda}) = \frac{\tilde{E}_c}{\tilde{E}^A}$$

we can define the quality metric function for the instant embodiment as $$\tilde{L} = \tilde{K} - K \qquad \text{(step 330)}$$
$$= f_K(\tilde{\Delta}^A, \tilde{\Lambda}) - f_K(\Delta^A, \Lambda)$$

which may be determined via calculation or fetched from a stored look-up table.

The ADD/DROP Dynamic Threshold functions, $G_{ADD}$ and $G_{DROP}$, respectively, are then defined as function of $\tilde{L} = \tilde{K} - K$ (rather than by the function $L = -K$, as was done for the embodiment illustrated in FIG. 2). In summary, the quality metric function derived in accordance with the principles shown in FIG. 3 reflects the additional incremental gain that may be obtained if the Candidate Set pilot being evaluated is ultimately added to the Active Set. There is no need to restrict the dynamic threshold functions, $G_{ADD}$ and $G_{DROP}$ to a single particular definition. Rather, it is left to the system designer to choose suitable functions for the dynamic threshold functions (step 340). If a candidate pilot exceeds $G_{ADD}$, the candidate qualifies for addition subject to approval of the ADD algorithm by the base station. Similarly, if an active pilot goes below $G_{DROP}$, the active pilot qualifies for dropping subject to approval of the DROP algorithm by the base station (step 350). Base station approval is typically based on other criteria, in addition to whether or not the dynamic threshold values have been triggered. Design of the ADD/DROP algorithms (design of the base station processing algorithm) is beyond the scope of this description, since the present invention is used to determine functionality of the mobile stations and the manner in which a mobile station determines and sets its dynamic thresholds for the ADD and DROP procedures (step 360). Assuming, that the base station processing algorithm approves of adding or dropping the proposed pilot, then the proposed pilot leg is added or dropped (as indicated) from the Active Set (step 370) and the next pilot is examined for inclusion in or deletion from the Active Set (step 380). In the alternative, if the base station processing algorithm does not approve of adding or dropping the proposed pilot, then the proposed pilot leg is not added to or dropped (as indicated) from the Active Set (step 390) and the next pilot is examined for inclusion or deletion from the Active Set (step 380).

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. For example, although the principles of the present invention as described in an exemplary embodiment are described as being performed at the mobile device, it would be apparent to those skilled in the art that the same principles could be applied and implemented at the base stations with which the mobile devices communicate. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts and flow diagrams and the like represent various processes which may be substantially represented in computer readable medium and so executed by a computer or processor, whether or not such computer or processor is explicitly shown.

The functions of the various elements shown in the FIGs., including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. In a wireless communication system, over which a mobile station is operable to monitor the signal strengths of a plurality of pilot signals transmitted from a plurality of base stations, a method by which said mobile station determines whether a particular pilot in a non-Active Set of pilots is to be assigned to an Active Set of pilots, said method comprising the steps of:

generating a quality metric derived as a function of
      a) detected pilot signal strengths corresponding to said Active Set of pilots, and
      b) detected pilot signal strengths corresponding to at least one pilot in said non-Active Set of pilots;
   determining a threshold value, said threshold value determined as a function of said quality metric; and
   assigning said particular pilot to said Active Set of pilots, if a signal strength corresponding to said particular pilot exceeds said threshold value.

2. The method in accordance with claim 1 wherein said wireless communication system is a code division multiple access (CDMA) system.

3. The method in accordance with claim 2 wherein said Active Set of pilots are selected for demodulation by said mobile station and are the only pilots to which a handoff of service can be made.

4. The method in accordance with claim 1, wherein assigning said particular pilot to said Active Set of pilots is subject to approval of a base station communicating with said mobile station.

5. The method in accordance with claim 1, wherein said quality metric is further derived as a function of:

c) signal strengths of said Active Set of pilots and said non-Active Set of pilots detected prior to any changes to said Active Set of pilots and said non-Active Set of pilots, and
   d) differences between said signal strengths of said Active Set of pilots.

6. The method in accordance with claim 5, wherein said threshold value is such that there is a minimum number of handoff legs per call for a given call signal quality.

7. In a wireless communication system, over which a mobile station is operable to monitor the signal strengths of a plurality of pilot signals transmitted from a plurality of base stations, a method by which said mobile station determines whether a particular pilot is to be removed from an Active Set of pilots, said method comprising the steps of:

generating a quality metric derived as a function of
   a) detected pilot signal strengths corresponding to said Active Set of pilots, and
   b) detected pilot signal strengths corresponding to at least one pilot in a non-Active Set of pilots;
determining a threshold value, said threshold value determined as a function of said quality metric; and
removing said particular pilot from said Active Set of pilots, if a signal strength corresponding to said particular pilot is less than said threshold value.

8. The method in accordance with claim 7, wherein said wireless communication system is a code division multiple access system.

9. The method in accordance with claim 8, wherein said Active Set of pilots are selected for demodulation by said mobile station and are the only pilots to which a handoff of service can be made.

10. The method in accordance with claim 7, wherein removing said particular pilot from said Active Set of pilots is subject to approval of a base station communicating with said mobile station.

11. A computer readable medium for use in a wireless communication system over which a mobile station is operable to monitor the signal strengths of a plurality of pilot signals transmitted from a plurality of base stations, and in which said mobile station determines whether a particular pilot in a non-Active Set of pilots is to be assigned to an Active Set of pilots, said computer readable medium having computer executable instructions for performing steps comprising:

generating a quality metric derived as a function of
   a) detected pilot signal strengths corresponding to said Active Set of pilots, and
   b) detected pilot signal strengths corresponding to at least one pilot in said non-Active Set of pilots;
determining a threshold value, said threshold value determined as a function of said quality metric; and
assigning said particular pilot to said Active Set of pilots, if a signal strength corresponding to said particular pilot exceeds said threshold value.

12. The method in accordance with claim 11, wherein said wireless communication system is a code division multiple access system.

13. The method in accordance with claim 12, wherein said Active Set of pilots are selected for demodulation by said mobile station and are the only pilots to which a handoff of service can be made.

14. A computer readable medium for use in a wireless communication system over which a mobile station is operable to monitor the signal strengths of a plurality of pilot signals transmitted from a plurality of base stations, and in which said mobile station determines whether a particular pilot is to be removed from an Active Set of pilots, a said computer readable medium having computer executable instructions for performing steps comprising:

generating a quality metric derived as a function of
   a) detected pilot signal strengths corresponding to said Active Set of pilots, and
   b) detected pilot signal strengths corresponding to at least one pilot in a non-Active Set of pilots;
determining a threshold value, said threshold value determined as a function of said quality metric; and
removing said particular pilot from said Active Set of pilots, if a signal strength corresponding to said particular pilot is less than said threshold value.

15. The method in accordance with claim 14, wherein said wireless communication system is a code division multiple access system.

16. The method in accordance with claim 15, wherein said Active Set of pilots are selected for demodulation by said mobile station and are the only pilots to which a handoff of service can be made.

17. A mobile station for use in wireless communication system over which said mobile station is operable to monitor the signal strengths of a plurality of pilot signals transmitted from a plurality of base stations, said mobile station being operable to determine whether a particular pilot in a non-Active Set of pilots is to be assigned to an Active Set of pilots, said mobile station comprising:

a processor; and
a storage device connected to said processor and including instructions for controlling said processor, said processor operative with said instructions to
generate a quality metric derived as a function of
   a) detected pilot signal strengths corresponding to said Active Set of pilots, and
   b) detected pilot signal strengths corresponding to at least one pilot in said non-Active Set of pilots;
determine a threshold value, said threshold value determined as a function of said quality metric; and
assign said particular pilot to said Active Set of pilots, if a signal strength corresponding to said particular pilot exceeds said threshold value.

18. The method in accordance with claim 17, wherein said wireless communication system is a code division multiple access system.

19. The method in accordance with claim 18, wherein said Active Set of pilots are selected for demodulation by said mobile station and are the only pilots to which a handoff of service can be made.

20. A mobile station for use in a wireless communication system over which said mobile station is operable to monitor the signal strengths of a plurality of pilot signals transmitted from a plurality of base stations, said mobile station being operable to determine whether a particular pilot is to be removed from an Active Set of pilots, said mobile station comprising:

a processor; and
a storage device connected to said processor and including instructions for controlling said processor, said processor operative with said instructions to
generate a quality metric derived as a function of
   a) detected pilot signal strengths corresponding to said Active Set of pilots, and
   b) detected pilot signal strengths corresponding to at least one pilot in a non-Active Set of pilots;
determine a threshold value, said threshold value determined as a function of said quality metric; and
remove said particular pilot from said Active Set of pilots, if a signal strength corresponding to said particular pilot is less than said threshold value.

21. The method in accordance with claim 20, wherein said wireless communication system is a code division multiple access system.

22. The method in accordance with claim 21, wherein said Active Set of pilots are selected for demodulation by said mobile station and are the only pilots to which a handoff of service can be made.

23. A mobile station for use in a wireless communication system over which said mobile station is operable to monitor the signal strengths of a plurality of pilot signals transmitted from a plurality of base stations, a said mobile station being operable to determine whether a particular pilot in a non-Active Set of pilots is to be assigned to an Active Set of pilots, said mobile station comprising:

means for generating a quality metric derived as a function of
  a) detected pilot signal strengths corresponding to said Active Set of pilots, and
  b) detected pilot signal strengths corresponding to at least one pilot in said non-Active Set of pilots;

means for determining a threshold value, said threshold value determined as a function of said quality metric; and means for assigning said particular pilot to said Active Set of pilots, if a signal strength corresponding to said particular pilot exceeds said threshold value.

24. The method in accordance with claim 23, wherein said wireless communication system is a code division multiple access system.

25. The method in accordance with claim 24, wherein said Active Set of pilots are selected for demodulation by said mobile station and are the only pilots to which a handoff of service can be made.

26. A mobile station for use in a wireless communication system over which said mobile station is operable to monitor the signal strengths of a plurality of pilot signals transmitted from a plurality of base stations, said mobile station being operable to determine whether a particular pilot is to be removed from an Active Set of pilots, said mobile station comprising:

means for generating a quality metric derived as a function of
  a) detected pilot signal strengths corresponding to said Active Set of pilots, and
  b) detected pilot signal strengths corresponding to at least one pilot in a non-Active Set of pilots;

means for determining a threshold value, said threshold value determined as a function of said quality metric; and means for removing said particular pilot from said Active Set of pilots, if a signal strength corresponding to said particular pilot is less than said threshold value.

27. The method in accordance with claim 26, wherein said wireless communication system is a code division multiple access system.

28. The method in accordance with claim 27, wherein said Active Set of pilots are selected for demodulation by said mobile station and are the only pilots to which a handoff of service can be made.

29. In a wireless communication system in which a mobile station is operable to monitor the signal strengths of a plurality of pilot signals transmitted from a plurality of base stations, a method comprising:

determining a threshold value as a function of
  a) detected pilot signal strengths corresponding to an Active Set of pilots, and
  b) detected pilot signal strength corresponding to at least one pilot in a non-Active Set of pilots;

assigning a particular pilot to said Active Set of pilots if a signal strength corresponding to said particular pilot exceeds said threshold value; and removing said particular pilot from said Active Set of pilots, if a signal strength corresponding to said particular pilot is less than said threshold value.

30. The method in accordance with claim 29, wherein said wireless communication system is a code division multiple access system.

31. The method in accordance with claim 30, wherein said Active Set of pilots are selected for demodulation by said mobile station and are the only pilots to which a handoff of service can be made.

32. A mobile station for use in a wireless communication system, in which said mobile station is operable to monitor the signal strengths of a plurality of pilot signals transmitted from a plurality of base stations, said mobile station adapted to:

determine a threshold value as a function of
  a) detected pilot signal strengths corresponding to an Active Set of pilots, and
  b) detected pilot signal strength corresponding to at least one pilot in a non-Active Set of pilots;

assign a particular pilot to said Active Set of pilots if a signal strength corresponding to said particular pilot exceeds said threshold value; and remove said particular pilot from said Active Set of pilots, if a signal strength corresponding to said particular pilot is less than said threshold value.

33. The method in accordance with claim 32, wherein said wireless communication system is a code division multiple access system.

34. The method in accordance with claim 33, wherein said Active Set of pilots are selected for demodulation by said mobile station and are the only pilots to which a handoff of service can be made.

* * * * *